United States Patent Office

3,415,715
Patented Dec. 10, 1968

3,415,715
PROCESS FOR BONDING METALS TO RUBBERS
Henricus J. M. Van Gorcom, Geleen, Netherlands, assignor to Stamicarbon N.V., Heerlen, Netherlands
No Drawing. Filed Aug. 9, 1965, Ser. No. 478,425
Claims priority, application Netherlands, Aug. 11, 1964, 6409201
24 Claims. (Cl. 161—190)

ABSTRACT OF THE DISCLOSURE

A method of laminating rubbery alkene-1 copolymers to metal is provided utilizing at least 2 separate adhesive layers, the adhesive layer adjacent the metal comprising halosulphonated polyolefine and a polyisocyanate, and the different adhesive adjacent the copolymer comprising a halosulphonated polyolefine, a polyisocyanate and a halogenated polyolefine.

---

The invention relates to a process for bonding metals to rubbery copolymers composed, wholly or mainly, of two or more alkenes-1.

According to a customary method for bonding metals to rubbers, the metal is coated with one or several layers of one or several adhesives, on which the unvulcanized rubber compound is applied after which the whole system is vulcanized, with or without the use of pressure. There exist several adhesives that can be used for this purpose. Surprisingly, it has been found, however, that the adhesives developed for use with the rubbers that have been known for quite some time now, are less suited for use with rubbery copolymers composed, wholly or mainly, of two or more alkenes-1. There are some adhesives that are specially recommended for these rubbers and one of the best contains a chlorosulphonated polyethylene and a polyisocyanate, but these, too, fail to give an optimum bond.

It has now been found that the bond between metals and rubbery copolymers composed, wholly or mainly, of two or more alkenes-1, can be improved if, in addition to an adhesive containing a halosulphonated polyolefine and a polyiscoyanate, an adhesive is employed containing a halosulphonated polyolefine, a polyisocyanate and a halogenated polyolefine, and the latter adhesive is applied between the former adhesive and the rubbery copolymer.

The invention relates therefore to a process for bonding metals to rubbery copolymers composed, wholly or mainly, of two or several alkenes-1, which process comprises applying an adhesive containing a halosulphonated polyolefine and a polyisocyanate between the metal and the rubber, and is characterized in that, moreover, a second adhesive containing a halosulphonated polyolefine, a polyisocyanate and a halogenated polyolefine, is applied between the abovementioned adhesive and the rubber, whereafter the whole system is vulcanized.

The group of rubbery colpolymers that can be bonded to metals by the process according to the invention comprises those copolymers which are composed exclusively of two or more alkenes-1, and also those which, in addition contain a small quantity, for example less than 10 percent by weight of a hydrocarbon with more than one double bond. These copolymers can be perpared according to known procedures by polymerizing the corresponding hydrocarbons with coordination catalysts under low pressure. The alkenes-1 may be taken, for example, from the following series: ethylene, propylene, butylene-1, hexene-1, heptene-1, 4-methylpentene-1, 5-methylheptene-1 and dodecene-1. Examples of hydrocarbons with more than one double bond are: pentadiene-1,4, hexadine-1,4, cyclopentadiene, dicylopentadiene, cyclo-octadiene, tri-vinylcyclohexane, norbornenes, and norbornadienes. Especially, copolymers of ethylene with propylene and, more in particular, those containing also a hydrocarbon with more than one double bond are excellently suited for being bonded to metals by the process according to the invention.

Prior to being bonded to the metals, the copolymers are mixed with appropriate vulcanization ingredients. If desired, other substances may also be added, such as carbon black and/or other fillers, antioxidants, ultra-violet stabilizers, antistatics, etc.

A halosulphonated polyethylene preferably used in the adhesives is chlorosulphonated polyethylene containing 0.1–10, preferably 0.5–3 percent by weight of sulphur, and 10–60, preferably 20–35 percent by weight of chlorine. However, halosulphonated derivatives of other polyolefines, for example of polypropylene, polyisobutylene or copolymers of olefines, may also be employed.

Suited polyisocyanates are, for example, triphenylmethanetriisocyanate, 3,3'-dimethyldiphenyl 4,4'-di-isocyanate and 3,3'-dimethoxydiphenyl 4,4'-di-isocyanate. Particularly with the latter very good results have been obtained.

Chlorinated, brominated or fluorinated polyolefines may be used as the halogenated polyolefine. These may be both homopolymers and copolymers of two or more olefines or of two or more olefines and a hydrocarbon with more than one double bond. Preferably, a chlorinated rubbery copolymer of ethylene and propylene with a chloride content between 5 and 40 weight per percent and a molar ethylene: propylene ratio between 1:4 and 4:1, is employed. The weight ratio between the polyisocyanate and the halosulphonated polyolefine is not critical, but lies preferably between 1:1 and 1:2, that between the halosulphonated polyolefine and the halogenated polyolefine in the second adhesive being preferably between 1:0.75 and 1:7.5. The optimum ratio, which depends on the halogen content of the halogenated polyolefine may, in each separate case, be determined experimentally in a simple manner. The adhesives are preferably dissolved in an aromatic hydrocarbon, such as benzene, toluene or xylene, so that they can be easily applied by spraying or brushing. If desired, the adhesives may be mixed with normal vulcanization ingredients and carbon-black or with other fillers, anti-oxidants etc.

By means of the adhesives according to the invention the rubbery copolymers can be bonded to a very wide variety of metals, such as steel, stainless steel, cast iron, aluminum, bronze, brass and copper. However, the metals must first be thoroughly cleaned, for example by sandblasting and subsequent degreasing with an organic solvent.

Example 1

Two solutions were prepared, having the following composition:

Solution A

Chlorosulphonated polyethylene, 29 percent by weight of chlorine.

| | Percent by weight |
|---|---|
| 1.25% by weight of sulphur (trademark: Hypalon) | 100 |
| Dimethoxydiphenyldiisocyanate | 100 |
| Magnesium oxide | 30 |
| Dipentamethylene thiuramtetrasulphide (trademark: Tetrone A) | 2 |
| Hydrogenated natural resin (trademark: Staybelite Resin) | 2 |
| Carbon black ("Fast extrusion furnace") | 100 |
| Aluminum silicate (trademark: Silteg AS 7) | 20 |
| Xylene | 1500 |

Solution B

| | |
|---|---:|
| Chlorinated copolymer of ethylene and propylene (15.9 percent by weight of chlorine, molar ethylene: propylene ratio=55:45). | 100 |
| Zinc oxide | 5 |
| Tetramethylthiuramdisulphide (trademark: Vulkacit thiuram) | 2 |
| 2-mercaptobenzothiazol (trademark: Vulkacit mercapto) | 1 |
| Carbon tetrachloride | 1900 |

These solutions were used to bond a terpolymer of ethylene, propylene and dicyclopentadiene (50, 46 and 4 percent by weight) to steel. The terpolymer was previously mixed with the required vulcanization ingredients, which yielded a mixture of the following composition:

| | Percent by weight |
|---|---:|
| Terpolymer | 100 |
| Zinc oxide | 5 |
| Stearic acid | 2 |
| Carbon black ("hig abrasion furnace") | 50 |
| Tetramethylthiuramdisulfide (trademark: Vulkacit thiuram) | 1 |
| 2-mercaptobenzothiazol (trademark: Vulkacit mercapto) | 0.5 |
| Sulphur | 1.5 |

The strength of the bond was tested in accordance with ASTM specification D429, procedure A. To that end steel test plates of the specified shape and dimensions were made, the bond faces of which were degreased with trichloroethylene, steel-blasted and degreased once more with trichloroethylene. After that, three thin layers of adhesive were applied, on top of each other, on the cleaned faces. Each adhesive layer was dried at room temperature before the next layer was applied. For the first two layers solution A was used on all plates. For the third layer mixtures of solution A and solution B were used in the ratios indicated in the table below. For comparison, solution A only, or solution B only, was used as the third layer. After that, test assemblies were composed of two test plates coated with layers of the same adhesive and an intermediate layer of the terpolymer. These assemblies were placed in the corresponding mold, and heated under pressure at 160° C. for 45 minutes and then stored at room temperature for 24 hours. Next, the breaking strength and the nature of the fracture were determined. The results are given in the following table.

| Composition 3rd adhesive layer | | Breaking strength, kg. | Nature of the fracture |
|---|---|---|---|
| Solution A, vol. percent | Solution B, vol. percent | | |
| 100 | 0 | 535 | RR 5, RC 95 |
| 60 | 40 | 545 | RR 10, RC 90 |
| 50 | 50 | 640 | RR 50, RC 50 |
| 40 | 60 | 885 | RR 100 |
| 30 | 70 | 900 | RR 100 |
| 20 | 80 | 775 | RR 50, RC 50 |
| 0 | 100 | 445 | RC 50, CC 50 |

In the above table RR denotes "fracture in the rubber," RC "fracture between rubber and adhesive" and CC "fracture in the adhesive." The numbers given behind these symbols denote the percentages. For example, RR5, RC95 denotes that 5% of the fracture was in the rubber and 95% between rubber and adhesive.

Example 2

The terpolymer of Example 1 was also bonded to free-cutting steel (composition according to the specification DIN 1651-9S-20K), cadmium-plated free-cutting steel (thickness of the cadmium layer 20μ), V₂A-steel (18-8), bronze, and aluminum. This was done in the same way as in Example 1, using the same adhesives, except that for the third adhesive layer only a mixture of 40% by volume of solution A and 60% by volume of solution B and a mixture of 30% by volume of solution A and 70% by volume of solution B were used.

In all cases a strong bond was obtained, as may be seen from the following table.

| Metal | Composition third adhesive layer | | Breaking strength, kg. | Nature of the fracture |
|---|---|---|---|---|
| | Solution A, vol. percent | Solution B, vol. percent | | |
| Free-cutting steel | 40 | 60 | 880 | RR 90, RC 10 |
| | 30 | 70 | 1,030 | RR 100 |
| Cadmium-plated Free-cutting steel | 40 | 60 | 925 | RR 100 |
| | 30 | 70 | 850 | RR 90, RC 10 |
| V₂A-steel (18-8) | 40 | 60 | 1,025 | RR 100 |
| | 30 | 70 | 990 | RR 100 |
| Bronze | 40 | 60 | 1,050 | RR 100 |
| | 30 | 70 | 1,070 | RR 1100 |
| Aluminium | 40 | 60 | 890 | RR 100 |
| | 30 | 70 | 930 | RR 100 |

I claim:

1. Process for bonding metals to rubbery copolymers consisting essentially of at least two alkenes-1 and 0–10% by weight of a hydrocarbon containing more than one double bond, which process comprises applying an adhesive, the resin components of which consist essentially of only a halosulphonated polyolefine and a polyisocyanate, between the metal and the copolymer, characterized in that, moreover, a second and different adhesive comprising a halosulphonated polyolefine, a polyisocyanate and a halogenated polyolefine is applied between the former adhesive and the copolymer, whereafter the whole system is vulcanized.

2. Process for bonding metals to rubbery copolymers said copolymers comprising at least two alkenes-1 and 0–10% by weight of a hydrocarbon containing more than one double bond, which process comprises applying an adhesive comprising a chlorosulphonated polyethylene containing 0.1–10% by weight of sulphur and 10–60% by weight of chlorine, and a polyisocyanate, between the metal and the copolymer, characterized in that, moreover, a second different adhesive comprising a chlorosulphonated polyethylene containing 0.1–10% by weight of sulphur and 10–60% by weight of chlorine, a polyisocyanate and a halogenated polyolefine is applied between the former adhesive and the copolymer, whereafter the whole system is vulcanized.

3. Process according to claim 2, characterized in that the chlorosulphonated polyethylene contains 0.5–3 percent by weight of sulphur and 20–30 percent by weight of chlorine.

4. Process according to claim 1, characterized in that 3,3'-dimethoxydiphenyl 4,4'-diisocyanate is used as the polyisocyanate.

5. Process according to claim 2, characterized in that 3,3'-dimethoxydiphenyl 4,4-diisocyanate is used as the polyisocyanate.

6. Process according to claim 1, characterized in that a halogenated copolymer of ethylene and propylene with a chlorine content of 5–40 percent by weight and a molar ethylene:propylene ratio between 1:4 and 4:1 is used as the halogenated polyolefine.

7. Process according to claim 2, characterized in that a halogenated copolymer of ethylene and propylene with a chlorine content of 5–40 percent by weight and a molar ethylene:propylene ratio between 1:4 and 4:1 is used as the halogenated polyolefine.

8. Process according to claim 4, characterized in that a halogenated copolymer of ethylene and propylene with a chlorine content of 5–40 percent by weight and a molar ethylene:propylene ratio between 1:4 and 4:1 is used as the halogenated polyolefine.

9. Process according to claim 5, characterized in that a halogenated copolymer of ethylene and propylene with a chlorine content of 5–40 percent by weight and a molar ethylene:propylene ratio between 1:4 and 4:1 is used as the halogenated polyolefine.

10. Process according to claim 1, characterized in that the polyisocyanate and the halosulphonated polyolefine are present in the adhesives in a weight ratio between 1:1 and 1:2.

11. Process according to claim 2, characterized in that the polyisocyanate and the chlorosulphonated polyethylene are present in the adhesives in a weight ratio between 1:1 and 1:2.

12. Process according to claim 7, characterized in that the polyisocyanate and the chlorosulphonated polyethylene are present in the adhesives in a weight ratio between 1:1 and 1:2.

13. Process according to claim 8, characterized in that the polyisocyanate and the halosulphonated polyolefine are present in the adhesives in a weight ratio between 1:1 and 1:2.

14. Process according to claim 9, characterized in that the polyisocyanate and the chlorosulphonated polyethylene are present in the adhesives in a weight ratio between 1:1 and 1:2.

15. Process according to claim 1, characterized in that the halosulphonated polyolefine and the halogenated polyolefine in the second adhesive are present in a weight ratio between 1:0.75 and 1:7.5.

16. Process according to claim 2, characterized in that the chlorosulphonated polyethylene and the halogenated polyolefine in the second adhesive are present in a weight ratio between 1:0.75 and 1:7.5.

17. Process according to claim 7, characterized in that the chlorosulphonated polyethylene and the halogenated polyolefine in the second adhesive are present in a weight ratio between 1:0.75 and 1:7.5.

18. Process according to claim 11, characterized in that the chlorosulphonated polyethylene and the halogenated polyolefine in the second adhesive are present in a weight ratio between 1:0.75 and 1:7.5.

19. Process according to claim 12, characterized in that the chlorosulphonated polyethylene and the halogenated polyolefine in the second adhesive are present in a weight ratio between 1:0.75 and 1:7.5.

20. Process according to claim 14, characterized in that the chlorosulphonated polyethylene and the halogenated polyolefine in the second adhesive are present in a weight ratio between 1:0.75 and 1:7.5.

21. Process according to claim 10, characterized in that the halosulphonated polyolefine and the halogenated polyolefine in the second adhesive are present in a weight ratio between 1:0.75 and 1:7.5.

22. Process for bonding metals to rubbery copolymers said copolymer being a terpolymer of at least two alkenes-1 and a hydrocarbon containing more than one double bond comprising applying a first adhesive onto said metal, said first adhesive comprising a chlorosulphonated polyethylene containing 0.1–10% by weight of sulphur and 10–60% by weight of chlorine and a polyisocyanate; applying a second adhesive onto said first adhesive, said second adhesive comprising a chlorosulphonated polyethylene containing 0.1–10% by weight of sulphur and 10–60% by weight of chlorine, a polyisocyanate and a halogenated copolymer of ethylene and propylene with a chlorine content of 5–40% by weight and a molar ethylene:propylene ratio between 1:4 and 4:1; applying the copolymer onto said second adhesive and vulcanizing the entire system.

23. A vulcanized laminated structure comprising: a metal layer; a first vulcanized adhesive in direct adhering contact with said metal, said first vulcanized adhesive comprising a reaction product of chlorosulphonated polyethylene containing 0.1–10% by weight of sulphur and 10–60% by weight of chlorine and a polyisocyanate; a second vulcanized adhesive in direct adhering contact with said first vulcanized adhesive, said second vulcanized adhesive comprising a reaction product of chlorosulphonated polyethylene containing 0.1–10% by weight of sulphur and 10–60% by weight of chlorine, a polyisocyanate and a halogenated copolymer of ethylene and propylene with a chlorine content of 5–40% by weight and a molar ethylene:propylene ratio between 1:4 and 4:1; a rubbery copolymer in direct adhering contact with said second vulcanized adhesive, said copolymer being a terpolymer of at least two alkenes-1 and a hydrocarbon containing more than one double bond.

24. A vulcanized laminated structure comprising: a metal layer; a first vulcanized adhesive in direct adhering contact with said metal, said first vulcanized adhesive action product of a halosulphonated polyolefine, a polyolefine and polyisocyanate; a second vulcanized adhesive in direct adhering contact with said first vulcanized adhesive; said second vulcanized adhesive being different from said first vulcanized adhesive and comprising a reaction product of a halosulphonate polyolefin, a polyisocyanate and a halogenated polyolefine; a rubbery copolymer composition in direct adhering contact with said second vulcanized adhesive, the copolymer contained in said copolymer composition consisting essentially of at least two alkenes-1 and $0$–10% by weight of a hydrocarbon containing more than one double bond.

References Cited

UNITED STATES PATENTS 3,051,666    8/1962    Snodden _____ 161—242 XR
3,170,832    2/1965    Wilson et al. _____ 161—119

EARL M. BERGERT, *Primary Examiner.*

W. E. HOAG, *Assistant Examiner.*

U.S. Cl. X.R.

161—218, 219, 243, 252; 156—310, 331, 333; 260—79.5, 897

UNITED STATES PATENT OFFICE
CERTIFICATE OF CORRECTION

Patent No. 3,415,715                                                            December 10, 1968

Henricus J. M. Van Gorcom

It is certified that error appears in the above identified patent and that said Letters Patent are hereby corrected as shown below:

Column 4, line 61, "4,4-diisocyanate" should read -- 4,4'-diisocyanate --. Column 6, lines 35 and 36, "action product of a halosulphonated polyolefine, a polyolefine" should read -- comprising a reaction product of a halosulphonated polyolefine --.

Signed and sealed this 10th day of March 1970.

(SEAL)
Attest:

Edward M. Fletcher, Jr.                                    WILLIAM E. SCHUYLER, JR.
Attesting Officer                                               Commissioner of Patents